United States Patent

Bienick et al.

[11] Patent Number: 5,935,504
[45] Date of Patent: Aug. 10, 1999

[54] METHOD FOR SUBSTITUTING HORIZONTALLY AND VERTICALLY OPENING MOLDS

[75] Inventors: Craig S. Bienick, Jenison; Howard C. Daley, Zeeland, both of Mich.

[73] Assignee: Gemtron Corporation, Sweetwater, Tenn.

[21] Appl. No.: 09/013,208

[22] Filed: Jan. 26, 1998

[51] Int. Cl.⁶ .................................................. B29C 45/10
[52] U.S. Cl. ..................... 264/297.2; 264/328.8; 264/328.11; 425/183; 425/190; 425/567
[58] Field of Search ............................. 264/297.2, 328.1, 264/328.8, 328.11; 425/190, 192 R, 193, 195, 183, 573, 574, 575, 567

[56] References Cited

U.S. PATENT DOCUMENTS

| | | |
|---|---|---|
| 3,068,520 | 12/1962 | Hehl . |
| 3,761,198 | 9/1973 | Hehl . |
| 3,761,214 | 9/1973 | Hehl . |
| 3,852,010 | 12/1974 | Hehl . |
| 4,005,961 | 2/1977 | Manceau .................................. 425/190 |
| 4,106,887 | 8/1978 | Yasuike et al. . |
| 4,120,922 | 10/1978 | Lemelson . |
| 4,318,874 | 3/1982 | Lemelson . |
| 4,487,569 | 12/1984 | Hehl ......................................... 425/589 |
| 4,981,638 | 1/1991 | Schad et al. ......................... 264/328.11 |
| 5,354,525 | 10/1994 | Fujimoto et al. ................... 264/328.11 |
| 5,540,493 | 7/1996 | Kane et al. . |
| 5,564,809 | 10/1996 | Kane et al. . |

Primary Examiner—Jill L. Heitbrink
Attorney, Agent, or Firm—Diller, Ramik & Wight, PC

[57] ABSTRACT

The invention is directed to a method for adapting injection molding machines utilizing horizontally opening and closing molds and their opening and closing mechanisms to vertically opening and closing molds and their opening and closing mechanisms and vice versa. An injection molding machine might, for example, be utilized to inject hot synthetic resin substantially horizontally into a cavity between horizontally opening and closing molds associated with horizontally opening and closing mechanisms. This horizontal mold and its opening and closing mechanism is removed relative to the injection molding machine and substituted therefor is a vertically opening and closing mold and its associated vertically opening and closing mechanisms. The hot plastic material from the horizontal injection molding machine is initially constrained in movement horizontally but subsequently vertically into the cavity of the vertically opening mold. This allows molds to be utilized with presses which might otherwise heretofore been structurally and functionally incompatible.

26 Claims, 3 Drawing Sheets

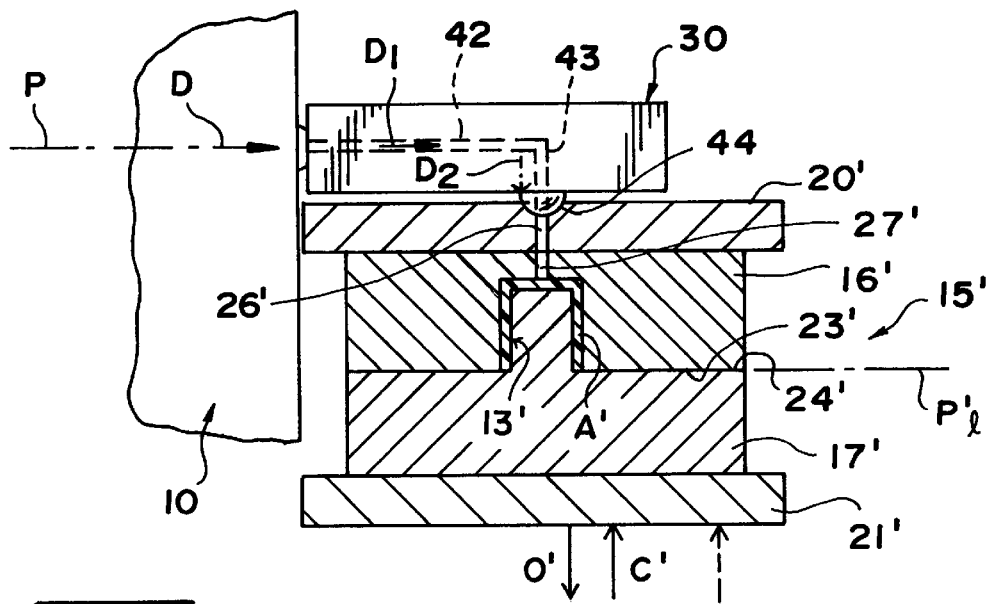
FIG_3
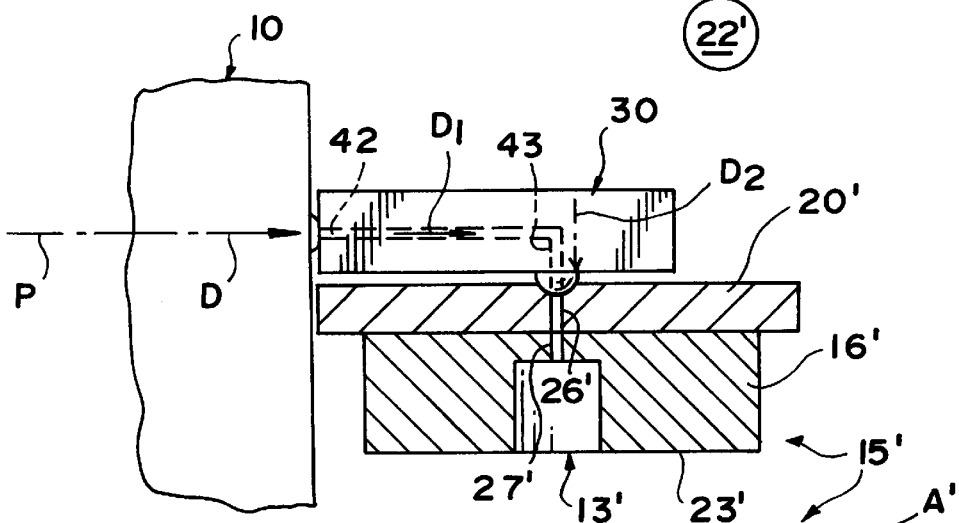
FIG_4
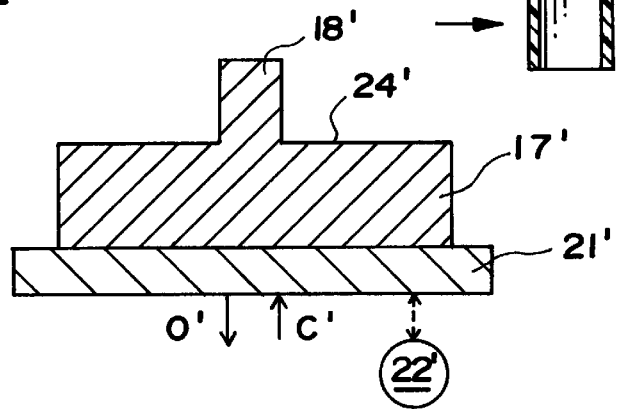

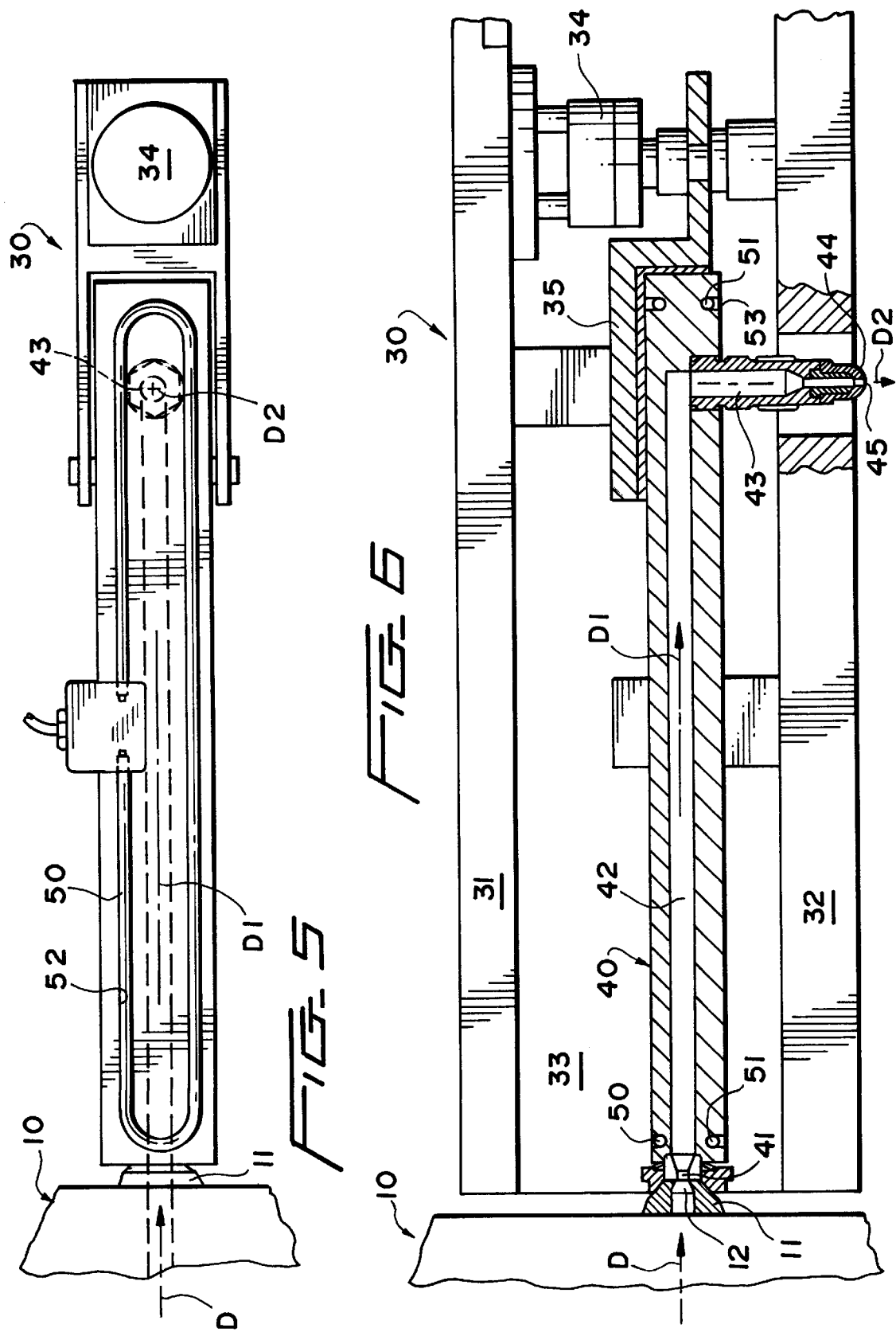

1

METHOD FOR SUBSTITUTING HORIZONTALLY AND VERTICALLY OPENING MOLDS

BACKGROUND OF THE INVENTION

Machines for injection molding synthetic resin materials are relatively common, and such injection molding machines or presses are used by the assignee of the present invention for manufacturing products, such as encapsulated shelves of the type disclosed in U.S. Pat. Nos. 5,540,493 and 5,564,809 granted on Jul. 30, 1996 and Oct. 15, 1996, respectively. The shelf or shelf assembly of the latter patents comprises a generally planar glass shelf panel, a pair of metallic support brackets and a one-piece injection molded encapsulation or encapsulating frame which encapsulates a perimeter edge of the glass panel and a substantial portion of the metallic support brackets. Such shelf assemblies are each manufactured by positioning a pair of support brackets and the glass shelf panel accurately with respect to a pair of mold bodies defining a cavity therebetween, relatively moving the mold bodies to close the same, and injecting synthetic plastic material into a contoured cavity portion to form the encapsulation or encapsulating frame. After the moldable material forming the encapsulating frame sets-up, hardens and cools, the mold bodies are opened and the shelf assembly is removed from the mold.

Conventional presses or injection molding machines are quite massive structures, are quite expensive and once installed the installation thereof is relatively "permanent." The molds are also quite large and are also quite expensive to fabricate. Therefore, considering the capital costs involved, the manufacturer of any type of injection molded product seeks to run an injection molding machine around the clock, twenty-four hours a day, in order to maintain unit costs at a minimum and maximize productivity. Many manufacturers of injection molded products utilize different equipment which is incompatible. For example, a number of injection molding machines in a plant might open and close mold bodies by imparting relative horizontal movement thereto, while other injection molding machines are associated with mold bodies which open and close by relative vertical motion. In a horizontally opening and closing mold a major parting line thereof between the mold bodies occupies a vertical plane and the nozzle of the injection molding machine and the sprue of the mold body or platen is in a generally horizontal plane. The mold opening and closing mechanism imparts relative horizontal motion between the mold bodies to move the same between open and closed positions. In the case of vertical injection, the injection nozzle is disposed vertically, the major parting line of the mold bodies is in a horizontal plane, and the mold bodies are moved vertically relative to each other between opened and closed positions.

It follows from the foregoing that horizontally opening and closing molds and their opening and closing mechanisms cannot be utilized with vertical injection molding machines and likewise vertically opening and closing molds and their opening and closing mechanisms cannot be utilized with horizontal injection molding machines. It likewise follows that if a plant has one line of horizontally opening molds and another line of vertically opening molds, it would be highly desirable if either could be rapidly and inexpensively converted to the other to accommodate fluctuations in product demand, or increase productivity, or the like.

SUMMARY OF THE INVENTION

In keeping with the foregoing, a primary object of the present invention is to provide a novel method of and apparatus for adapting horizontally opening molds and the opening and closing mechanisms therefor to vertical injection machines and vice versa.

In one example of the injection molding method of the present invention, hot molten synthetic plastic material is injected along a first path of travel essentially horizontally in a first direction to a first delivery point into a first cavity of a first multi-part mold including a first pair of mold bodies which are opened and closed by relatively horizontal motion therebetween. This first multi-part mold is removed and in lieu thereof is substituted an adapter manifold having a first passage portion which continues the injection of the hot plastic material horizontally and subsequently a passage portion normal thereto directs the hot plastic material in a vertical plane into a second multi-part mold whose mold bodies are opened and closed by relative vertical motion therebetween. Thus, the adapter manifold permits the utilization of a vertically opening and closing mold and the vertically opening and closing mechanism therefor with an otherwise incompatible horizontal injection machine or press normally utilized with a horizontally opening mold, and vice versa.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 3 is a fragmentary highly diagrammatic side elevational view, partly in vertical cross-section, and illustrates an adapter manifold associated with the injection molding machine of FIGS. 1 and 2 for redirecting the injected hot resin from a horizontal flow path to a downward vertical flow path into a cavity of a pair of mold bodies which open and close by movement in a vertical direction.

FIG. 4 is a fragmentary highly diagrammatic side elevational view, partly in vertical cross-section, and illustrates the mold bodies of FIG. 3 vertically opened and an injection molded article being ejected therefrom.

FIG. 5 is a top plan view looking downwardly in FIGS. 3 and 4, and illustrates a resistance heater associated with the adapter manifold for heating a flow passage through which flows the hot synthetic resin.

FIG. 6 is a fragmentary side elevational view of the adapter manifold of FIG. 5 with parts broken away and shown in cross-section for clarity, and illustrates the manner in which the flow passage of the manifold directs hot resin from a horizontal flow path to a vertical flow path into the cavity of the vertically opening and closing mold bodies of FIGS. 3 and 4.

DESCRIPTION OF THE PREFERRED EMBODIMENTS

Figure 1:
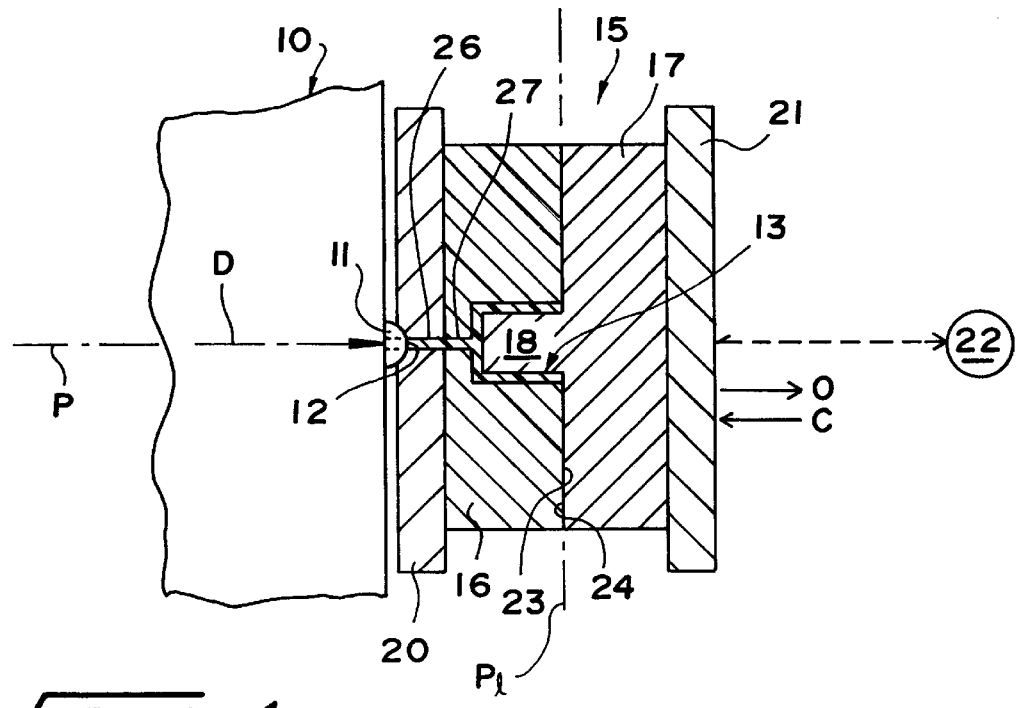
FIG. 1 is a fragmentary highly diagrammatic side elevational view, partly in vertical cross-section, and illustrates an injection molding machine or press and its associated nozzle from which hot synthetic resin is injected from left-to-right along a generally horizontal path into a mold cavity of a mold defined between a pair of relatively horizontally movable mold bodies defining a parting line therebetween substantially normal to the direction of injection.
Figure 2:
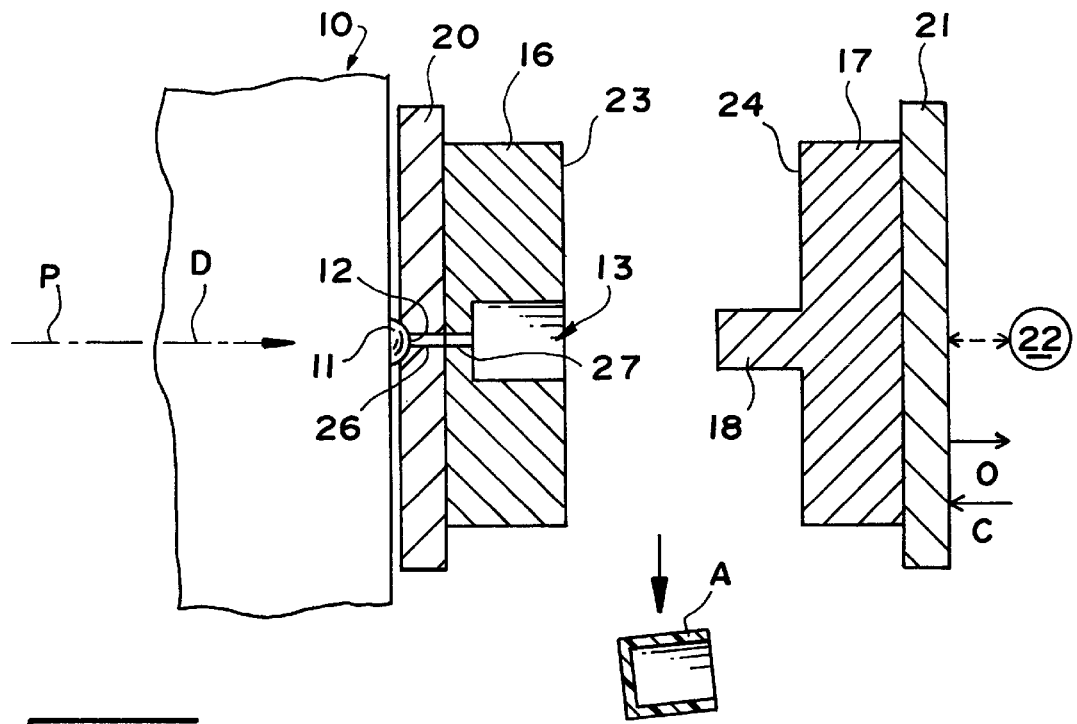
FIG. 2 is a fragmentary highly diagrammatic side elevational view, again with parts in vertical cross-section, and illustrates the mold bodies opening substantially horizontally incident to the ejection of the injection molded product from the mold cavity.

A conventional injection molding machine or injection press is generally designated by the reference numeral 10 in FIGS. 1 and 2, and though unillustrated, the same includes an injection cylinder, an injection screw and a nozzle 11 defining a discharge opening 12 for injecting hot synthetic polymeric/copolymeric resin along a substantially horizontally flow path P in a first direction D which in FIGS. 1 and 2 is left-to-right. The injection molding machine or press 10 is of a conventional construction and may, for example, be specifically constructed in the manner disclosed in U.S. Pat. No. 4,106,887 issued on Aug. 15, 1978 to Yasuke et al. and/or U.S. Pat. Nos. 4,120,922 and 4,318,874 issued on Oct. 17, 1978 and Mar. 9, 1982, respectively, to Lemelson. The specifics of the control system of the latter two patents may also preferably be utilized in conjunction with the present invention.

The press or injection molding machine 10 is operative to controllably feed one or more hot synthetic polymeric/copolymeric resin molding materials into a cavity 13 of a mold 15 defined by a pair or relatively horizontally moving mold bodies 16, 17 with the latter carrying a core 18 which in part defines the cavity 13 and imparts a generally cup-shaped configuration thereto. The mold body 16 is carried by a stationary platen or support 20 while the mold body 17 is carried by a movable platen or support 21 with which is associated an opening and closing mechanism or servo 22, such as a hydraulic actuator or cylinder which is operative to open and close the mold 15 by moving the mold bodies 16, 17 relative to each other horizontally, reciprocally, linearly parallel to the direction D, and substantially normal to a parting line PI (FIG. 1) which lies in a generally vertical plane PI and is also substantially normal to the direction D. The parting line or parting plane PL is defined by opposing surfaces 23, 24 of the opposing mold bodies 16, 17, respectively. The degree of relative opening of the mold bodies 16, 17 is sufficient to permit the removal of the molded product or article A (FIG. 2) from the mold cavity 13 through suitable ejectors (not shown). The opening and closing mechanism 22 is preferably operative in response to signals generated by a program controller or computer, such as is disclosed in U.S. Pat. Nos. 4,318,874 and 4,120,922.

During the injection of the resin outwardly of the discharge opening or orifice 12, the same passes through a port or sprue 26 coincident to the orifice 12 formed in the stationary platen 20 and a passage 27 in the fixed mold 16 which opens into the cavity 13.

During a typical injection molding cycle, the mold bodies 16, 17 are closed by movement of the platen 21 and the mold body 17 to the left opposite to the direction D, as indicated by the mold closing headed arrow C in FIG. 1. The injected resin exits the orifice or delivery point 12, passes through the ports or passages 26, 27, fills the cavity 13, and eventually cools, sets and hardens. The opening and closing mechanism 22 moves the movable platen 21 and the mold body 17 to the right in the mold opening direction O (FIG. 2) thereby removing the plug 18 from the cavity 13. The article A is subsequently conventionally ejected from the cavity 13 or from the plug 18. The platen 21 and the mold 17 is then again closed by movement in the mold closing direction C, and the process is repeated.

As was noted earlier herein, conventional presses or injection molding machines, such as the injection molding machine 10, are massive, expensive, and once installed the installation thereof is essentially permanent. Thus, an injection molding machine or several in a typical commercial "line" when installed for essentially horizontal injection (horizontal path P and direction D of FIG. 1) cannot be, so to speak, physically rotated 90° for vertical injection into molds and mold opening mechanisms which operate vertically. However, molds, platens and their associated opening and closing mechanisms are smaller, lighter and are thereby more readily adaptable to relocation and usage with different injection molding machines to accommodate product demand, for example. However, horizontally opening molds 15 and their opening and closing mechanisms 22 (FIGS. 1 and 2) could only heretofore be associated with horizontally injecting presses 10; and vertically opening molds, such as a mold 10' in FIGS. 3 and 4 and their vertically opening and closing mechanisms 22', could heretofore only be associated with vertical injecting presses. Thus, though the mold 15' is diagrammatically illustrated as being essentially identical to the mold 15, and thus has been provided with identically, though primed, reference numerals to indicate identical structure, the mold 15' is so related to its opening and closing mechanism 22' that it necessarily heretofore had to be associated with vertical presses or vertical injection mold machines. However, in accordance with the present invention a novel adapter manifold 30 (FIGS. 3 and 4) is provided such that the same conventional horizontal injection molding press or injection molding machine 10 of FIGS. 1 and 2 can be utilized to inject hot synthetic resin into a cavity 13' (FIGS. 3 and 4) defined by mold bodies 16', 17' which are vertically opened and closed by vertical movement imparted thereto by the vertically operative mold opening and closing mechanism 22' to initiate the ejection of injection molded articles A' therefrom. Thus, the injection molding machine 10 of FIGS. 1 through 4 is maintained in its "permanent" horizontal location, the horizontally opening and closing mold 15 and its opening and closing mechanism 22 is removed from the position shown in FIGS. 1 and 2, and the latter are replaced by the vertically opening and closing mechanism 22' and the mold 15', as shown in FIGS. 3 and 4, including the stationary mold body 16', and its associated stationary platen 2', and the cooperative movable mold body 17' and the movable platen 21'. The stationary platen 20' and the stationary mold 16' are conventionally secured in fixed relationship to the injection molding machine 10 such that the adapter manifold 30 will essentially function as an extension of the nozzle 11 and discharge orifice 12.

The adapter manifold or manifold 30 (FIGS. 5 and 6) is defined by one or more rigid unified supporting plates 31, 32, 33 with others omitted for clarity, conventionally supported at an end adjacent the press 10 and at an opposite end by a bridging trunnion 34 and a connector 35. The structural details of the supporting elements 31 through 35 are essentially immaterial to the overall invention so long as the same relatively rigid support therebetween a relatively rigid elongated metallic rectangular manifold plate(s) 40 defining at one end an entrance opening or orifice 41, an elongated passage 42, a passage 43 normal to the passage 42 and a nozzle 44 having a discharge opening or delivery point 45. With the adapter manifold 30 rigidly supported in the manner illustrated in FIGS. 3 and 4 adjacent the injection press 10, the nozzle 11 of the injection press 10 is seated contiguous the entrance orifice 41 of the adapter manifold plate 40 with the axis of the injection opening 12 of the nozzle 11 being coincident to the entrance orifice 41 and the passage 42. Similarly, the nozzle 44 seats against the stationary platen 20' (FIGS. 3 and 4) with the axis of the discharge opening 45 and the passage 43 being in coincidence with the axis of the port 26' and the passage 27', and all of the latter being normal to the port or passage 42. Substantially oval-shaped resistance heaters 50, 51 are seated in like contoured grooves 52, 53, respectively, and power thereto maintains the entire interior of the passageways 42, 43 and the orifices 41, 45 sufficiently hot to maintain the resin molten and flowable to effect the injection thereof into the cavity 13', in the manner apparent from FIG. 3 of the drawings. Thus, the press 10 (FIGS. 3, 4 and 6) operates in a conventional manner to inject hot resin under pressure outwardly of the nozzle 12, into the entrance opening 41, along the passageway 42 in a direction D1 (FIG. 6) coincident to and in the same direction as the direction as the direction D of FIGS. 1 through 6. Subsequently, the hot resin flow direction changes to a vertical downward direction D2 (FIG. 6) entering the cavity 13' of the vertically opening mold 15' resulting in the injection molded product A' (FIG. 3).

Upon cooling of the article A', the opening mechanism 22' lowers the movable platen 21' (FIG. 4) and the mold body 17' associated therewith followed by the subsequent ejection of the article A'. The opening and closing mechanism 22' is thereafter moved upwardly to the closed position and the process is repeated. In this manner, the vertically opening mold 15' and its vertically opening and closing mechanism 22', heretofore incompatible with other than a vertical injection molding machine or press, is fully operative in conjunction with the horizontal press 10 and, of course, vice versa. Thus, more molds, be they designed for vertical opening and closing or horizontal opening and closing can be readily conformed to the opposite of their intended use to accommodate the injection molding of articles to maximize productivity, plant capacity, and the like.

Though the invention has been described in conjunction with a relatively simple cup-shaped article A, other more complicated articles and products can be injection molded in appropriately contoured mold cavities as, for example, the encapsulated shelf assemblies disclosed in U.S. Pat. Nos. 5,564,809 and 5,540,493. For example, the assignee's present injection molds encapsulate shelf assemblies as disclosed in the latter patents, some being injection molded in one plant utilizing horizontal injection molding machines with horizontally opening and closing molds and associated opening and closing mechanisms and in another plant such encapsulated shelf assemblies are manufactured by vertical injection molding machines, vertically opening and closing molds and vertically operative opening and closing mechanisms. The adapter manifold 30 was developed to achieve the earlier described mold and mold actuating mechanism interchangeability to effect product diversity, product production balance and the maximization of capacity between the diverse and heretofore seemingly incompatible molds and the injection machines at such plants.

Although a preferred embodiment of the invention has been specifically illustrated and described herein, it is to be understood that minor variations may be made in the apparatus without departing from the spirit and scope of the invention, as defined the appended claims.

We claim:

1. A method of injection molding an article comprising the steps of
   (a) injecting hot molten synthetic plastic material along a first path of travel in a first direction to a first delivery point into a first cavity of a first multi-part mold including a first pair of mold bodies having a first parting line therebetween disposed substantially normal to the first direction;
   (b) substituting a second multi-part mold, having a second cavity defined by a second pair of mold bodies and a second parting line, for the first multi-part mold;
   (c) positioning the second multi-part mold with the second parting line thereof in a plane substantially parallel to the first direction;
   (d) injecting the hot molten synthetic plastic material along the first path of travel in the first direction beyond the first delivery point; and
   (e) continuing the injection of the hot molten synthetic plastic material from beyond the first delivery point along a second path of travel substantially coincident to the first path of travel and subsequently along a third path of travel in a direction substantially normal to the first path direction and into the second cavity at a second delivery point offset from the first path of travel.

2. The article injection molding method as defined in claim 1 wherein the first direction is vertical.

3. The article injection molding method as defined in claim 1 wherein the first direction is horizontal.

4. The article injection molding method as defined in claim 1 wherein the first multi-part mold is located in a first position with an injection port of the first multi-part mold being located at the first delivery point, and the second multi-part mold is located at a second position spaced from the first position with an injection port of the second multi-part mold being located at the second delivery point.

5. The article injection molding method as defined in claim 2 wherein the first multi-part mold is located in a first position with an injection port of the first multi-part mold being located at the first delivery point, and the second multi-part mold is located at a second position spaced from the first position with an injection port of the second multi-part mold being located at the second delivery point.

6. The article injection molding method as defined in claim 3 wherein the first multi-part mold is located in a first position with an injection port of the first multi-part mold being located at the first delivery point, and the second multi-part mold is located at a second position spaced from the first position with an injection port of the second multi-part mold being located at the second delivery point.

7. The article injection molding method as defined in claim 4 wherein the second delivery point is in a plane spaced from and parallel to a plane in which lies the first delivery point.

8. The article injection molding method as defined in claim 7 wherein said planes are horizontal.

9. The article injection molding method as defined in claim 7 wherein said planes are vertical.

10. The article injection molding method as defined in claim 5 wherein the second delivery point is in a plane spaced from and parallel to a plane in which lies the first delivery point.

11. The article injection molding method as defined in claim 6 wherein the second delivery point is in a plane spaced from and parallel to a plane in which lies the first delivery point.

12. The article injection molding method as defined in claim 10 wherein said planes are horizontal.

13. The article injection molding method as defined in claim 11 wherein said planes are vertical.

14. A method of injection molding an article comprising the steps of
   (a) injecting hot molten synthetic plastic material along a first path of travel in a first direction to a first delivery point into a first cavity of a first multi-part mold including a first pair of mold bodies;
   (b) opening the first cavity by imparting relative movement between the first pair of mold bodies in substantially the first direction;
   (c) substituting a second multi-part mold having a second cavity defined by a second pair of mold bodies for the first multi-part mold;

(d) injecting the hot molten synthetic plastic material along the first path of travel in the first direction beyond the first delivery point;

(e) continuing the injection of the hot molten synthetic plastic material from beyond the first delivery point along a second path of travel substantially coincident to the first path of travel and subsequently along a third path of travel in a third direction substantially normal to the first direction and into the second cavity at a second delivery point offset from the first path of travel; and (f) opening the second cavity by imparting relative movement between the second pair of mold bodies in substantially the third direction.

15. The article injection molding method as defined in claim 14 wherein the first direction is vertical.

16. The article injection molding method as defined in claim 14 wherein the first direction is horizontal.

17. The article injection molding method as defined in claim 14 wherein the first multi-part mold is located in a first position with an injection port of the first multi-part mold being located at the first delivery point, and the second multi-part mold is located at a second position spaced from the first position with an injection port of the second multi-part mold being located at the second delivery point.

18. The article injection molding method as defined in claim 15 wherein the first multi-part mold is located in a first position with an injection port of the first multi-part mold being located at the first delivery point, and the second multi-part mold is located at a second position spaced from the first position with an injection port of the second multi-part mold being located at the second delivery point.

19. The article injection molding method as defined in claim 16 wherein the first multi-part mold is located in a first position with an injection port of the first multi-part mold being located at the first delivery point, and the second multi-part mold is located at a second position spaced from the first position with an injection port of the second multi-part mold being located at the second delivery point.

20. The article injection molding method as defined in claim 14 wherein the second delivery point is in a plane spaced from and parallel to a plane in which lies the first delivery point.

21. The article injection molding method as defined in claim 20 wherein said planes are horizontal.

22. The article injection molding method as defined in claim 20 wherein said planes are vertical.

23. The article injection molding method as defined in claim 18 wherein the second delivery point is in a plane spaced from and parallel to a plane in which lies the first delivery point.

24. The article injection molding method as defined in claim 19 wherein the second delivery point is in a plane spaced from and parallel to a plane in which lies the first delivery point.

25. The article injection molding method as defined in claim 23 wherein said planes are horizontal.

26. The article injection molding method as defined in claim 24 wherein said planes are vertical.

* * * * *